United States Patent
Gutt et al.

(10) Patent No.: US 8,570,216 B2
(45) Date of Patent: Oct. 29, 2013

(54) DIFFERENTIAL CORRECTION SYSTEM ENHANCEMENT LEVERAGES ROVING RECEIVERS ENABLED FOR A NON-GPS, SECONDARY PN AND T SIGNAL TO CHARACTERIZE LOCAL ERRORS

(75) Inventors: Gregory M. Gutt, Ashburn, VA (US);
Arun Ayyagari, Seattle, WA (US);
David A. Whelan, Newport Coast, CA (US); Michael Lee O'Connor, Redwood City, CA (US); David G. Lawrence, Santa Clara, CA (US)

(73) Assignee: The Boeing Company, Chicago, IL (US)

( * ) Notice: Subject to any disclaimer, the term of this patent is extended or adjusted under 35 U.S.C. 154(b) by 231 days.

(21) Appl. No.: 13/114,027

(22) Filed: May 23, 2011

(65) Prior Publication Data

US 2012/0139782 A1 Jun. 7, 2012

Related U.S. Application Data (63) Continuation-in-part of application No. 12/130,880, filed on May 30, 2008, now Pat. No. 7,952,518.

(51) Int. Cl.
*G01S 19/07* (2010.01)
(52) U.S. Cl.
USPC .................................................. 342/357.44
(58) Field of Classification Search
USPC .................................................. 342/357.44
See application file for complete search history.

(56) References Cited

U.S. PATENT DOCUMENTS

| | | | |
|---|---|---|---|
| 5,734,348 A | 3/1998 | Aoki et al. | |
| 6,100,842 A | 8/2000 | Dreier et al. | |
| 6,529,830 B1 | 3/2003 | Eschenbach | |
| 6,677,894 B2* | 1/2004 | Sheynblat et al. | 342/357.46 |
| 7,042,392 B2 | 5/2006 | Whelan et al. | |
| 7,372,400 B2 | 5/2008 | Cohen et al. | |
| 7,468,696 B2 | 12/2008 | Bornholdt | |
| 7,468,697 B2* | 12/2008 | Matsuoka et al. | 342/464 |
| 7,489,926 B2 | 2/2009 | Whelan et al. | |
| 7,554,481 B2 | 6/2009 | Cohen et al. | |
| 7,579,986 B2 | 8/2009 | DiEsposti | |
| 7,579,987 B2 | 8/2009 | Cohen et al. | |
| 7,583,225 B2 | 9/2009 | Cohen et al. | |
| 7,619,559 B2 | 11/2009 | DiEsposti | |
| 7,688,261 B2 | 3/2010 | DiEsposti | |
| 2005/0156782 A1* | 7/2005 | Whelan et al. | 342/357.16 |
| 2005/0159891 A1 | 7/2005 | Cohen et al. | |

(Continued)

OTHER PUBLICATIONS

International Search Report, PCT Application Ser. No. PCT/US2012/035661, Sep. 20, 2012.

(Continued)

*Primary Examiner* — Harry Liu
(74) *Attorney, Agent, or Firm* — Vista IP Law Group LLP; Cynthia A. Dixon (57) ABSTRACT

System, methods, and devices for a self-sustaining differential corrections network that employs roving reference devices (RRDs) as reference stations for improving positioning, navigation, and timing (PN&T) solutions for other enabled local roving and/or stationary receiving devices (RDs) are disclosed herein. The disclosed differential correction system enhancement leverages RRDs enabled for a non-global positioning system (non-GPS), secondary PN&T signal to characterize local errors. These local errors are then used by local RDs in combination with a signal to calculate an improved PN&T estimate for the RDs.

36 Claims, 5 Drawing Sheets

(56) References Cited

U.S. PATENT DOCUMENTS

| | | |
|---|---|---|
| 2007/0159388 A1 | 7/2007 | Allison et al. |
| 2007/0236388 A1* | 10/2007 | Fiedelak et al. ......... 342/357.08 |
| 2008/0059059 A1 | 3/2008 | Cohen et al. |
| 2008/0143605 A1 | 6/2008 | Bornholdt |
| 2008/0146246 A1 | 6/2008 | Bornholdt |
| 2009/0174597 A1 | 7/2009 | DiLellio et al. |
| 2009/0228210 A1 | 9/2009 | Gutt |
| 2009/0315764 A1 | 12/2009 | Cohen et al. |
| 2009/0315769 A1 | 12/2009 | Whelan et al. |
| 2010/0171652 A1 | 7/2010 | Gutt et al. |
| 2010/0201569 A1 | 8/2010 | Lee et al. |

OTHER PUBLICATIONS

J.D. Neumann, et al.: "Real-Time Carrier Phase Positioning Using the RTCM Standard Message Types 20/21 and 18/19", Proceedings of ION GPS 1997, Sep. 16, 1997, pp. 857-866, XP55037997, Kansas City, MO, USA, p. 859, section "Using types 20/21 vs. types 18/19".

* cited by examiner

DIFFERENTIAL CORRECTION SYSTEM ENHANCEMENT LEVERAGES ROVING RECEIVERS ENABLED FOR A NON-GPS, SECONDARY PN AND T SIGNAL TO CHARACTERIZE LOCAL ERRORS

CROSS-REFERENCE TO RELATED APPLICATION

This application is a Continuation-In-Part application of, and claims the benefit of U.S. patent application Ser. No. 12/130,880, filed May 30, 2008, which is hereby incorporated by reference in its entirety.

BACKGROUND

The present disclosure relates to a differential correction system enhancement that leverages roving receivers. In particular, it relates to a differential correction system enhancement that leverages roving receivers enabled for a non-global positioning system (non-GPS), secondary positioning navigation and timing (PN&T) signal to characterize local errors.

SUMMARY

The present disclosure relates to a method, system, and apparatus for a differential correction system enhancement that leverages roving receivers enabled for a non-GPS, secondary PN&T signal to characterize local errors. In particular, the present disclosure teaches a system involving a roving reference device (RRD) and a receiving device (RD). For this embodiment(s), the RRD generates the differential correction information. The RRD is aware of its geographic location. In addition, the RRD includes a RRD receiver for receiving a signal from at least one transmission source. Also, the RRD is aware of the location of the transmission source(s). The RRD further includes a RRD clock for collecting a first measurement of the signal. Further, the RRD includes a RRD memory for storing the first measurement. Also, the RRD includes a RRD processor for processing the first measurement, the location of the RRD, and the location of the transmission source(s) to generate differential correction information. In addition, the RRD includes a RRD transmitter for transmitting a differential correction information signal that includes the differential correction information.

The RD includes a RD first receiver for receiving the signal from the transmission source(s). The RD is aware of the location of the transmission source(s). The RD further includes a RD clock for collecting a second measurement of the signal. Further, the RD includes a RD memory for storing the second measurement. In addition, the RD includes a RD second receiver for receiving the differential correction information signal from the RRD. Also, the RD includes a RD processor for processing the differential correction information, the second measurement, and the location of the transmission source(s) to generate a location estimate for RD.

In one or more embodiments, the RRD becomes aware of its location because the RRD further includes a global positioning system (GPS) receiver for receiving GPS signals, and a GPS processor for processing the GPS signals to obtain the location of the RRD. In at least one embodiment, the RRD becomes aware of its location because the RRD further comprises a cell receiver to receive signals from a cell tower, and a cell processor for processing the signals to obtain the location of the RRD. In some embodiments, the RRD becomes aware of its location by using an inertial reference system. In one or more embodiments, the RRD becomes aware of its location by using mapping and/or terrain data.

In at least one embodiment, at least one transmission source is a satellite, a pseudo-satellite, a terrestrial transmitter, a Wi-Fi transmitter, and/or a cell tower transmitter. In one or more embodiments, at least one satellite is a low Earth orbiting (LEO) satellite, a medium Earth orbit (MEO) satellite, and/or a geosynchronous Earth orbit (GEO) satellite. In some embodiments, at least one LEO satellite is an Iridium satellite.

In one or more embodiments, the RRD is aware of the location of the transmission source(s) because the RRD receiver receives a location signal from the transmission source(s) indicating the location of the transmission source (s), and the RRD processor processes the location signal to obtain the location of the transmission source(s). In at least one embodiment, the RRD is mobile and/or stationary. In some embodiments, the RRD transmitter transmits the differential correction information signal wirelessly and/or on a wired connection.

In some embodiments, the RD is aware of the location of the transmission source(s) because the RD first receiver receives a location signal from the transmission source(s) indicating the location of the transmission source(s), and the RD processor processes the location signal to obtain the location of the transmission source(s). In one or more embodiments, the RRD transmitter transmits the differential correction information signal to the RD second receiver via an intermediary device.

In one or more embodiments, a system for providing differential corrections for positioning involves a RRD and a RD. For these embodiments, the RD generates the differential correction information. The RRD is aware of its geographic location. The RRD includes a RRD receiver for receiving a signal from at least one transmission source. Further, the RRD includes a RRD clock for collecting a first measurement of the signal. Also, the RRD includes a RRD transmitter for transmitting a RRD signal that includes the first measurement and the location of the RRD.

The RD includes a RD first receiver for receiving the signal from the transmission source(s). The RD is aware of the location of the transmission source(s). The RD further includes a RD clock for collecting a second measurement of the signal. Also, the RD includes a RD second receiver for receiving the RRD signal from the RRD. In addition, the RD includes a RD memory for storing the second measurement, the first measurement, and the location of the RRD. Additionally, the RD includes a RD processor for processing the second measurement and the location of the transmission source(s) to generate a location estimate for the RD. Also, the RD processor is used for processing the first measurement, the location of the RRD, and the location of the transmission source(s) to generate differential correction information. Additionally, the RD processor is used for processing the differential correction information and the location estimate for the RD to generate a corrected location estimate for the RD.

For these embodiments, the RRD becomes aware of its location because the RRD further comprises a GPS receiver for receiving GPS signals, and a GPS processor for processing the GPS signals to obtain the location of the RRD. In at least one embodiment, the RRD becomes aware of its location because the RRD further comprises a cell receiver to receive signals from a cell tower, and a cell processor for processing the signals to obtain the location of the RRD. In some embodiments, the RRD becomes aware of its location by using an inertial reference system. In at least one embodiment, the RRD becomes aware of its location by using mapping and/or terrain data.

In at least one embodiment, the RRD is mobile and/or stationary. In one or more embodiments, the RRD transmitter transmits the RRD signal wirelessly and/or on a wired connection. In some embodiments, at least one transmission source a satellite, a pseudo-satellite, a terrestrial transmitter, a Wi-Fi transmitter, and/or a cell tower transmitter. In one or more embodiments, at least one satellite is a LEO satellite, a MEO satellite, and/or a GEO satellite. In one or more embodiments, at least one LEO satellite is an Iridium satellite.

In some embodiments, the RD is aware of the location of the transmission source(s) because the RD first receiver receives a location signal from the transmission source(s) indicating the location of the transmission source(s), and the RD processor processes the location signal to obtain the location of the transmission source(s). In some embodiments, the RRD transmitter transmits the RRD signal to the RD second receiver via an intermediary device.

In one or more embodiments, a system for providing differential corrections for positioning involves a RRD, a RD, and an intermediary device. For these embodiments, the intermediary device generates the differential correction information. The RRD is aware of its geographic location. The RRD includes a RRD receiver for receiving a signal from at least one transmission source. Further, the RRD includes a RRD clock for collecting a first measurement of the signal. In addition, the RRD includes a RRD transmitter for transmitting a RRD signal that includes the first measurement and the location of the RRD.

The RD includes a RD receiver for receiving the signal from the transmission source(s). The RD also includes a RD clock for collecting a second measurement of the signal. Also, the RD includes a RD transmitter for transmitting a RD signal that includes the second measurement.

The intermediary device is aware of the location of the transmission source(s). The intermediary device includes an intermediary first receiver for receiving the RRD signal from the RRD, and an intermediary second receiver for receiving the RD signal from the RD. The intermediary device also includes an intermediary processor for processing data of the RRD signal, data of the RD signal, and the location of the transmission source(s) to generate a location estimate for the RD and to generate differential correction information. Also, the intermediary processor is used for processing the differential correction information and the location estimate for the RD to generate a corrected location estimate for the RD.

In at least one embodiment, the transmission source(s) is a satellite, a pseudo-satellite, a terrestrial transmitter, a Wi-Fi transmitter, and/or a cell tower transmitter. In some embodiments, at least one satellite is a LEO satellite, a MEO satellite, and a GEO satellite. In one or more embodiments, at least one LEO satellite is an Iridium satellite. In some embodiments, the RD transmitter transmits the RD signal wirelessly and/or on a wired connection.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for a differential correction system enhancement that leverages roving receivers. Specifically, this system relates to a differential correction system enhancement that leverages roving receivers enabled for a non-global positioning system (non-GPS), secondary positioning navigation and timing (PN&T) signal to characterize local errors. In particular, the present disclosure teaches systems, methods, and devices according to various embodiments that enable a self-sustaining differential corrections network that may use roving and/or stationary transceivers as reference stations (e.g., roving reference devices (RRDs)) for improving positioning, navigation, and timing solutions for other enabled local roving receivers (e.g., receiver devices (RDs)). This disclosed differential correction system enhancement leverages roving receivers (i.e. RRDs) enabled for a non-GPS, secondary PN&T signal to characterize local errors. These local errors are then used by local receiving devices (i.e. RDs) in combination with a signal to calculate an improved PN&T estimate.

Existing navigation and timing signals provided by various existing satellite navigation systems often do not provide satisfactory system performance. In particular, the signal power, bandwidth, and geometrical leverage of such navigation and timing signals are generally insufficient to meet the needs of many demanding usage scenarios.

Existing navigation and timing approaches based on, for example, global positioning system (GPS) signals may not typically be available to a navigation user in many instances. Typically, a GPS receiver must receive at least four simultaneous ranging sources to permit three dimensional positioning and accurate time transfer. However, GPS signals often provide insufficient, low-signal power or geometry to be able to readily penetrate urban canyons or walls of buildings. Other navigation approaches based on, for example, cellular telephone or television signals typically lack vertical navigation information.

Existing systems have attempted to address indoor navigation deficiencies by the use of various approaches, for example, internal navigation systems, specialized beacons, and highly sensitive GPS systems. However, inertial navigation systems drift and are expensive. Beacons require specialized fixed assets that are expensive and not standardized and, thus, have only specialized utility. Sensitive GPS systems often do not perform to user expectations due to the weakness of the GPS signals in indoor environments.

Differential GPS (DGPS) correction techniques enhance the accuracy and integrity of positional data that is collected using GPS receivers. GPS receivers rely on timing satellite signals in order to measure satellite to user range. However, within the atmosphere, the signal speed is reduced and, thus, affects the perception of the location of the satellite, making it seem farther away. The error profile of receiver range measurements includes components, which are correlated for all of the receivers operating in the same geographic area (e.g., orbit ephemeris, clock errors, and atmospheric delays). DGPS relies on the use of two GPS receivers being in relatively close proximity to one another so that they should have similar atmospheric errors.

Within the basic DGPS architecture, a GPS receiver at a known location is often referred to as a base or reference station. This reference station remains stationary and calculates its own position or satellite ranges based on local navigation satellite transmissions. The reference station compares this calculated position or satellite ranges with its known true location. This difference can be applied to other local roving GPS receivers real-time as an error correction, and thereby often significantly improving performance. Generally speaking, since the roving GPS receiver still needs to be able to track GPS satellites to apply the differential correction, DGPS does not solve the problem of a GPS receiver performing a position fix indoors or in an urban canyon.

Systems using Iridium or other low earth orbiting (LEO) satellites for positioning work well indoors due to the relatively high signal strengths received from these satellites. The accuracy of these systems could be improved with an accurate differential correction.

As a wide array of defense and commercial services and products may be improved by higher accessibility to indoor PN&T aiding signals, there are benefits to a system architecture that would (1) provide the ability to track navigation signals indoors and in urban canyons, and (2) minimize or eliminate the need for a dedicated reference station infrastructure, which can prove to be a barrier to entry to some approaches or applications.

The present disclosure relates generally to positioning, navigation, and timing systems that would benefit from aiding (i.e. differential corrections) information in an attenuated environment. More specifically, the present disclosure leverages existing roving transceivers to function as reference stations for other local users with enabled hardware. In at least one embodiment, many smart phone users in a metropolitan region may be able to both simultaneously receive GPS and an additional non-GPS, near-earth aiding signal. The users in a non-attenuated environment, for instance those outside with a clear sky view, can act as reference stations for users indoors that are likely to have signal degradation/jamming indoors. This allows these indoor users to have their own aiding infrastructure of local reference stations without having to develop, build, deploy, and sustain these architecture elements of the system. In at least one embodiment, navigation-enabled devices can choose to be apart of or opt out of this architecture. For example, on setting up a new phone that is enabled for navigation, the user is prompted by a graphical user interface (GUI) as to whether they want to participate in this aiding scheme. In general, the accuracy of a differential system is a function of distance to a reference station and, thus, the users using these roving reference stations will have improved corrections due to their close vicinity (i.e. reference stations within 1 kilometer (km) versus 50 km away).

The present disclosure has several novelties. One novelty in particular relates to a differential correction network architecture, which is relatively self-sustaining. Typically, these architectures are highly reliant on reference stations that must be maintained as part of a permanent or semi-permanent architecture. These stations are typically surveyed so that their positions are known to a high accuracy, which enables the station to best estimate local errors that will impact ranging signals so that they can be corrected. The disclosed system is self-sustaining as in lieu of semi-permanent or permanent reference or base stations. The system uses other users within the local area to develop differential corrections that can be used to improve and/or allow improved PN&T solutions. Reference stations in differential correction systems create upfront sunk costs that can become a barrier to entry to some systems or applications. The disclosed system does not require these and, thus, the costs associated with them including long-term maintenance and surveying costs associated with these receivers also goes to zero.

Another novelty of the present disclosure is that the exemplary signal being differentially corrected is a near-earth signal (such as a LEO satellite signal, a Wi-Fi signal, a cell phone signal, and a pseudo-satellite signal) with sufficient transmission power to allow the signal to penetrate an indoor environment when using an appropriate signal structure. This allows the differential correction to aid non-GPS signal based PN&T systems whose signals can penetrate indoors. Geolocation methods may be used to improve position estimates in lieu of a surveyed position to aid in the calculation of the differential corrections.

In accordance with at least one embodiment of the present disclosure, a system in which a mobile device that is performing accurate positioning and time (for example with GPS) can provide differential corrections from at least one radio frequency (RF) ranging source to a second device that is unable to perform positioning (for example, because it is within an attenuated environment), thereby improving its ability to complete positioning (for example, because the differential corrections are collected locally).

There are multiple embodiments that relate to where key processing is completed within the system (e.g., in RD, RRD, an intermediary entity or device, or any combination thereof). For example, in accordance with at least one embodiment of the presentation disclosure, a roving reference device (RRD), which is capable of transmitting data, transmits data to an intermediary entity for data processing. This intermediary entity or device may be enveloped through various implementations including, but not limited to, a server in a wired or wireless network, another receiving device, and through a web-based service. The disclosed system and method allows for "dumb" receivers with minimal processing power, or untrained users, to utilize the system without degradation to their receiver's performance or to the corrections the device receives.

It should be noted that, in one or more embodiments, the RD and RRD are identical in terms of capabilities. For example, they may either be considered "dumb receivers" or may be capable of processing differential corrections. In other embodiments, the RD and RRD are not identical in terms of their capabilities. In some embodiments, RRD has the ability to process differential corrections and transmit them directly to RD. In at least one embodiment, RD has the same capabilities of a RRD, except RD also has additional functionally allowing it to process the differential corrections and correct its errors. Furthermore, the RD and the RRD may be navigation-enabled cell phones supporting one another via differential corrections at different points in time and, thus, both devices would have the additional differential correction and error correction functionality.

In accordance with at least one embodiment of the present disclosure, a RRD comprises a receiver capable of performing positioning and capable of receiving an alternate or aiding signal from a near-earth source (such as a LEO signal or a terrestrial signal); a memory to log data received; an optional processor to pre-process and/or process data; and a transmitter to transmit a signal (e.g., a RF signal) in a wired or wireless network. In one or more embodiments, a RD comprises a first receiver capable of receiving an alternate or aiding signal from a near-earth source; a memory to log data received; an optional processor to pre-process and/or process data; and a second receiver for receiving a signal (e.g. a RF signal) in a wired or wireless network. In some embodiments, a intermediary entity comprises a receiver capable of receiving a signal (e.g., a RF signal) from a RRD and may also be capable of receiving a signal (e.g., a RF signal) from a RD; a memory to log data received; an optional processor to pre-process and/or process differential corrections; and a transmitter to transmit a signal (e.g., a RF signal) in a wired or wireless network to provide processed data to a RD.

The disclosed methods and devices provide an operative system for a self-sustaining differential corrections network. Specifically, this system relates to leveraging at least one roving transceiver to function as a reference station for other local roving users with enabled receiving devices. As with a generic differential correction system, a correction is derived using a reference station with an approximately known position. In lieu of a typical stationary permanent or semi-permanent reference station, this system uses at least one roving reference transceiver to calculate its position using received GPS ranging signals. Additionally, the transceiver is able to measure an alternate non-GPS, near-earth signal. As this non-GPS, near-earth signal contains sources of errors that are inconsistent with the GPS position estimate, the difference of these estimates will characterize the local errors associated with the alternative signal.

At least one local roving receiver may be unable to use its signal (GPS) to navigate due to the signal being unavailable in an attenuated or jammed environment. Additionally, this receiver may be able to receive its secondary non-GPS, near earth signal allowing it to garner a position estimate with localized errors. This receiver may receive data from the roving reference receiver enabling it to correct these local position errors and to navigate based on its secondary signal in times of its own local GPS outages. These corrections can be applied for real-time or post-processing error corrections. It is important to note that while in practice this process may be occurring repeated/continuously, this concept is explained as a snapshot in time allowing for the concept to be more easily articulated.

In one embodiment, at least one roving transceiver, $R_1$, takes at least one position measurement from at least one RF signal source, $S_1$, and at least one position measurement from at least one RF signal source, $S_2$. In at least one embodiment, at least one of these signals, may be transmitted from at least one Iridium Satellite. In one or more embodiments, the primary PN&T signal is GPS and the second signal is an aiding signal.

In one or more embodiments, a roving transceiver, $R_1$, uses the ranging measurements from $S_1$ to calculate a position estimate. As part of this disclosure, it is assumed the errors associated with $S_1$ have been reasonably corrected (e.g., by DGPS or by a satellite based augmentation system (SBAS)). In addition, the roving transceiver collects ranging measurements from $S_2$ and compares the measurements with the position estimate to characterize the local errors associated with $S_2$.

The characterized errors can then be transmitted along with the $R_1$ position estimate (e.g., via broadcasting) to a local receiver, $R_2$, which for some reason cannot reliably use its primary PN&T signal. The local receiver $R_2$ uses the transmitted error information to correct its position estimate based on its secondary PN&T signal.

In an alternate embodiment, raw data, such as unprocessed measurements from $S_1$ and $S_2$, may be transmitted from $R_1$ to an intermediary entity to complete some processing, which is then made available to $R_2$ via some means such as a data broadcast or other more direct transmission.

In yet another embodiment of the present disclosure, raw data, such as unprocessed measurements from $S_1$ and $S_2$, may be transmitted from both $R_1$ and $R_2$ (which both have transmit capabilities) to an intermediary entity (e.g., a server) where the positioning of $R_2$ may be calculated and then made available to $R_2$ to access. In alternative embodiments, the system may use other signals or ranging methods for developing solutions which may include measurements and/or data from at least one of the following: GPS; GLONASS; global navigation satellite system (GNSS); near-earth; or other non-GPS signals transmitted from LEO, MEO or a combination of alternative satellites and/or satellite constellations; and terrestrial-based systems such as a inertial measurements, barometric measurements, Wi-Fi signals, ultra wide band (UWB), Zigbee, RF tag, or other positioning beacons, such as enabled geocache.

The local receiver, $R_2$, may or may not be capable of receiving the same RF signals as $R_1$ but may be capable of accepting raw data or alternative data formats associated with those signals. The receiver, $R_2$, may be located in an attenuated environment (i.e. indoors) where its primary RF signal it uses for PN&T is jammed and, thus, is unavailable or otherwise unreliable on its own. The receiver, $R_2$, may leverage PN&T information from at least one roving receiver to improve its PN&T solutions.

The preferred embodiment of the present disclosure is advantageous to other similar architectures as it reduces the processing requirement on the receivers; depending on the specific embodiment, either one or both may also have transmit capabilities. Additional processing on such devices has many disadvantages and, thus, the minimization of this requirement may be important to relevant applications. Increasing the processing requirement directly relates to the device cost and the device's power requirement, both of which are critical elements for users of this system. For example, a typical consumer with a mobile phone expects the phone to be reasonably portable and its ability to be portable is driven by the phone's power source (i.e. its battery). Obviously, the ideal scenario is that a battery is able to last indefinitely between charges, but the more realistic scenario is that the phone's battery time between charges is maintained within an acceptable "inconvenience" threshold which is dependent on the user and the user's given situation. In this scenario, the initial cost of the device and sustaining portability/power is critical to encourage adoption from wireless providers and consumers to use an architecture where there is minimal processing at the device-level.

In the preferred embodiment architecture, at least one roving reference device, $R_1$, aids at least one second receiving device, $R_2$, which is unable to reliably receive its primary GPS PN&T signal for some reason. In this embodiment, both devices must be capable of both receiving and transmitting data. $R_1$ receives no direct benefit from this process other than the potential exchange of similar support at a future point in time from $R_2$ or other devices, which may act as roving reference devices for it. In order to minimize the negative impact to users and their devices, an intermediary entity is considered as part of this exemplary embodiment to minimize the power draw from both the aiding and "receiving of aid" transceivers. However, in practice, an intermediary entity may increase system complexity to a degree such that using no intermediary device is favored.

In order to appropriately characterize errors which are primarily atmospheric based, $R_1$ and $R_2$ need to be within an acceptable range from one another and, thus, are considered to be "local" to one another. If the correction is coming from too far away, it is much less accurate because the signal is going through a different part of the atmosphere and, thus, the resultant correction would be skewed (i.e. a spatial decorrelation of ranging error). $R_1$ may be located in an unattenuated environment such as outside with open sky where it can receive its primary PN&T signal that is not capable of penetrating indoors reliably. In the one embodiment, the PN&T signal is a GPS signal and $R_1$ is able to track enough GPS signals to get a GPS position fix. While this position estimate will still include errors, it will replace a typical "surveyed" position with acceptable accuracy. A receiver tracking GPS is generally able to calculate its position to about 3 meters (approximately 10 feet) if it is able to use, for example, a wide area augmentation system (WAAS), a satellite-based augmentation system (SBAS), or other differential correction (which is available in some cell phones, and would certainly be available if a server is doing all of the calculations). Additionally $R_1$ may receive a second ranging signal that is capable of penetrating indoors, for example, a non-GPS near-earth ranging signal. $R_1$ may receive broadcast data from each of these signals, and then transmit the data to an intermediary entity. These measurements may include raw measurements and/or calculated values such as ranging measurements from signals in space or terrestrial sources, inertial measurements, barometric measurements, and estimated PN&T solutions.

$R_2$ is unable to consistently receive its primary PN&T signal. It may be located in an attenuated environment indoors or in an urban canyon, and its primary PN&T signal is not capable of penetrating an indoor environment reliably. However, $R_2$ is still reliably receiving the second ranging signal indoors. $R_2$ receives broadcast data from this signal and transmits data to the same intermediary entity that $R_1$ supplied data. These measurements may include raw measurements and or calculated values such as: ranging measurements from signals in space or terrestrial sources, inertial measurements, barometric measurements, and estimated PN&T solutions.

The intermediary entity accepts the data from $R_1$ and $R_2$, and may conduct pre-processing including formatting of the raw data for processing or applying differential corrections. The intermediary entity conducts processing which uses the converted raw data to calculate, for example, the differential corrections for $R_2$, the position of $R_1$, and/or the position of $R_2$. In one case, $R_2$ updates its solution based on received corrections from the intermediary entity, and now can function in a region that it was previously unable to do so. In another example, $R_2$ receives its pre-computed position from the intermediary entity.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
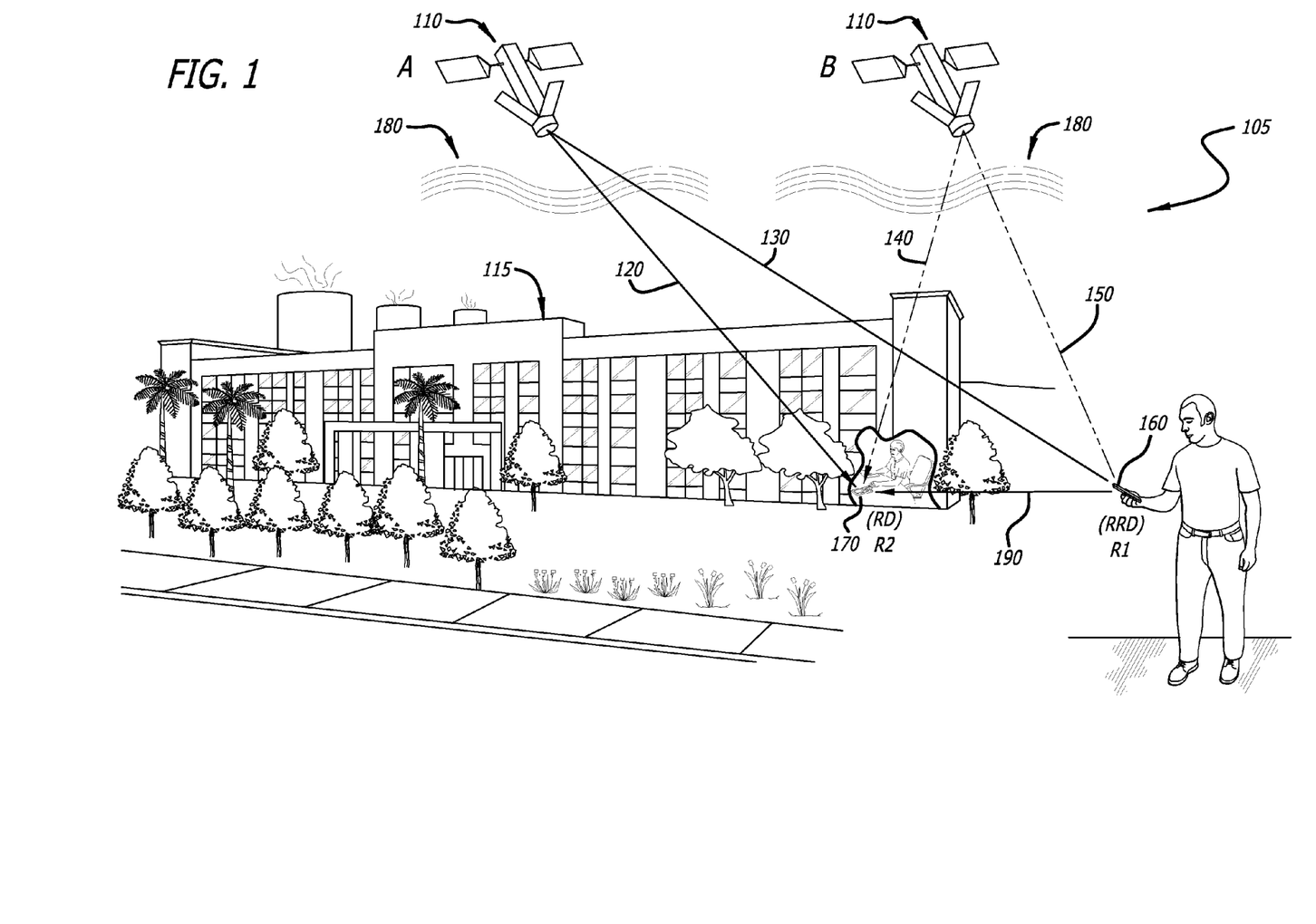
FIG. 1 shows an embodiment of the disclosed differential correction system enhancement that leverages roving receivers and employs a LEO satellite as a transmission source where the roving receiver device (RRD) and the receiving device (RD) are employed in smart phones.

FIG. 1 shows an embodiment of the disclosed differential correction system enhancement 105 that leverages roving receives and employs a LEO satellite as a transmission source where the roving receiver device (RRD) and the receiving device (RD) are employed in smart phones. This figure shows a LEO satellite 110 transmitting signals 120, 130, 140, 150 to a roving reference device (RRD) 160 and to a receiving device (RD) 170 over time from position A to position B.

The RRD 160 and the RD 170 are each employed in a smart phone. The users of the smart phones have downloaded the associated positioning or geolocation application onto their smart phone. In addition, the users of the smart phones have elected and agreed to participate in the receiving of positioning information (and/or differential correction information) from other participating smart phones, and the sharing of their own specific positioning information for the positioning or geolocation application to use. Processors in the smart phones run the geolocation application in order to generate the differential correction information. In this figure, the RRD 160 is shown to be located outside, where it can readily receive GPS signals and, thus, obtain a very accurate location of itself. The accurate location information for the RRD 160 can be used to generate differential correction information that can be used by the RD 170 as well as other nearby participating smart phones. Also in this figure, the RD 170 is shown to be located inside of a building 115. Since the RD 170 is located in an indoors environment, it is not able to receive GPS signals. The RD 170 uses the accurate location information (and/or the differential correction information) of the RRD 160 to be able to obtain an accurate location for itself. It should be noted that in one or more embodiments, the RRD 160 and the RD 170 may be employed in various different types of personal devices including, but not limited to, cellular phones, personal digital assistants (PDAs), and laptop computers.

For this system, the RRD 160 and RD 170 are in relatively close proximity to one another so that they have similar atmospheric conditions 180. The RRD 160 is aware of the LEO satellite 110 location and its own RRD 160 location accurately via GPS signals. The RRD 160 gets its location from GPS signals because GPS accuracy helps to correct the RD 170 location.

In some embodiments, the RRD 160 itself does not process its received GPS signals to determine its own accurate location. In these embodiments, the RRD 160 transmits the GPS signals it receives to an intermediate node (e.g., a processing facility) for the intermediate node to process the GPS signals and to calculate the accurate location of the RRD 160. After the intermediate node processes the GPS signals and determines the accurate location of the RRD 160, the intermediate node transmits the accurate location information of the RRD 160 to the RRD 160.

The RRD 160 includes a receiver for receiving the LEO satellite 110 signals 130, 150; an accurate clock for time stamping the data from the received signals 130, 150 with a received time; and memory for storing the time stamped data. The RRD 160 also includes a processor for processing the time stamped data, the RRD 160 location, and the LEO satellite 110 location to generate differential correction information; and a transmitter for transmitting 190 the differential correction information.

The RD 170 is aware of the LEO satellite 110 location. The RD 170 includes a first receiver for receiving the LEO satellite 110 signals 120, 140; an accurate clock for time stamping the data from the received signals 120, 140 with a received time; and memory for storing the time stamped data. In addition, the RD 170 includes a second receiver for receiving the differential correction information from the RRD 160. Also, the RD 170 has a processor for processing the time stamped data in its memory and the location of the LEO satellite 110 to generate a location estimate for itself. The processor is also used for processing the differential correction information with the location estimate of the RD 170 to generate a corrected location estimate for RD 170.

As an example, at an initial satellite position A, at time t1, the LEO satellite 110 sends a primary signal 120, 130 that is received by the RRD 160 at time t2a and by the RD 170 at time t3a. The processor of the RRD 160 calculates a differential correction signal, t2−t2a, where t2 represents the time the RRD 160 would have received the primary signal sent at time t1 if there were no delays due to atmospheric 180 and/or other conditions. This time, t2, is calculated from the known range between the LEO satellite 110 and the known location of the RRD 160. The RRD 160 then transmits 190 the differential correction information to the RD 170. The RD 170 corrects its received signal using the differential correction information. The RD 170 updates its location using the corrected timing, t3=t3a+t2a−t2, to get the corrected range from the RD 170 to the LEO satellite 110. The process is repeated for multiple satellite positions (including position B) to obtain an accurate position for the RD 170.

It should be noted that in some embodiments, the RRD 160 and the RD 170 receive radio frequency (RF) signals from one or more regional terrestrial transmission sources, such as amplitude modulation (AM) or frequency modulation (FM) radio transmitters, television transmitters, or other local transmitters. For these embodiments, the RRD 160 and RD 170 measure phases of the carrier signal and/or the time of arrival of signals modulated onto the carrier relative their respective local clocks. Alternatively, the RRD 160 and/or RD 170 provide samples or pre-processed samples (e.g., filtered and downconverted samples) for those RF signals to an external processor for additional processing. In some embodiments, a known location and clock offset of the RRD 160 are combined with measurements of the RF signals at the RRD 160 to find the clock offset of the local transmitter or the transmission time of the signals from the local transmitter. In at least one embodiment, carrier phase ambiguities associated with the carrier phase of the transmission source are resolved using an approximate location derived from LEO satellite doppler and/or range based positioning. In one or more embodiments, a plurality of transmission sources are used in the process of resolving cycle ambiguities in a manner similar to resolving GPS cycle ambiguities in a differential carrier phase global navigation satellite system (GNSS).

Figure 2:
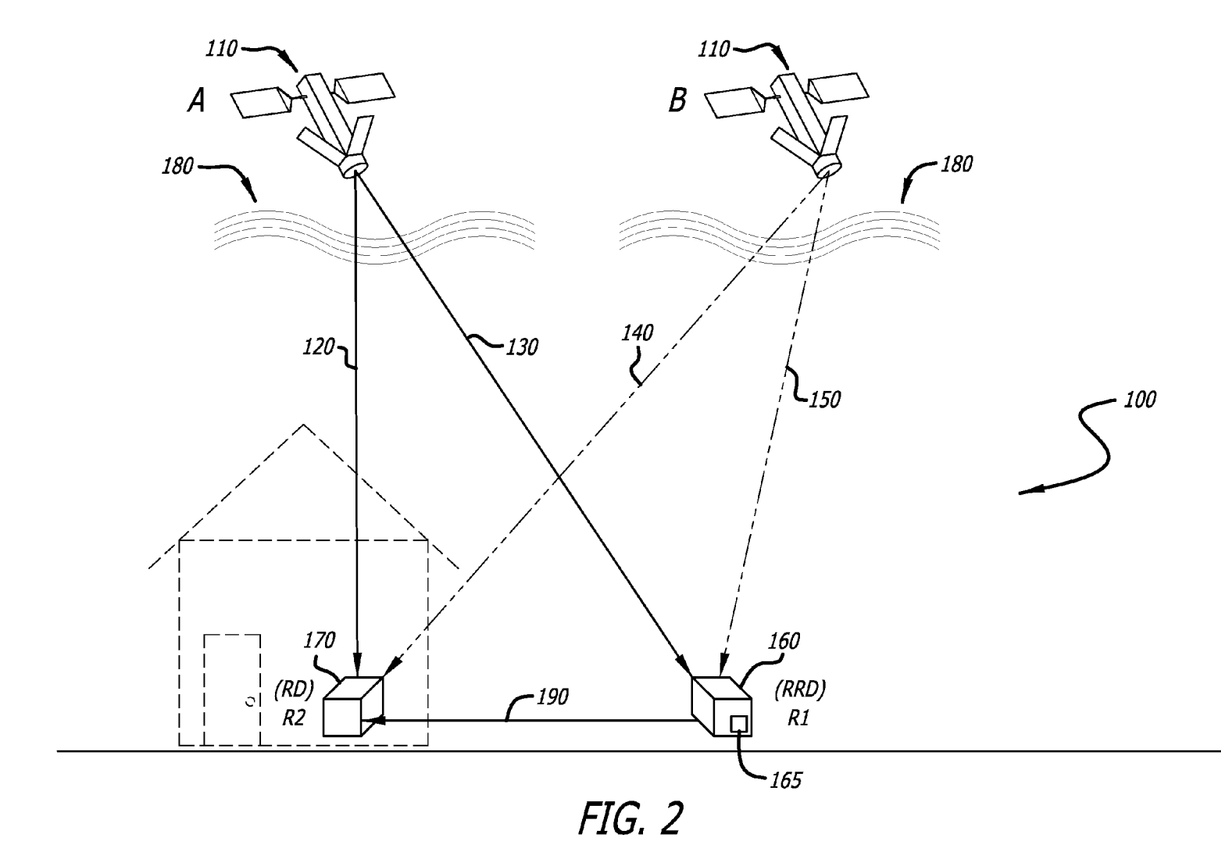
FIG. 2 illustrates an embodiment of the disclosed differential correction system enhancement that leverages roving receivers and employs a LEO satellite as a transmission source where the RRD processes the differential correction information.

FIG. 2 illustrates an embodiment of the disclosed differential correction system enhancement 100 that leverages roving receivers and employs a LEO satellite as a transmission source where the roving reference device (RRD) processes the differential correction information. In this figure, a LEO satellite 110 is shown to be transmitting signals 120, 130, 140, 150 to a roving reference device (RRD) 160 and to a receiving device (RD) 170 over time from position A to position B. The RRD 160 and RD 170 are in relatively close proximity to one another so that they have similar atmospheric conditions 180. The RRD 160 is aware of the LEO satellite 110 location and its location accurately via GPS signals. However, it should be noted that the RRD 160 can get the LEO satellite 110 location data from a number of different sources including, but not limited to, ephemeris tables, data directly downlinked from the LEO satellite 110, data received from a cell phone, and data from the internet. The RRD 160 includes a receiver for receiving the LEO satellite 110 signals 130, 150; an accurate clock for time stamping the data from the received signals 130, 150 with a received time; and memory for storing the time stamped data. The RRD 160 also includes a processor 165 for processing the time stamped data, the RRD 160 location, and the LEO satellite 110 location to generate differential correction information; and a transmitter for transmitting 190 the differential correction information.

The RD 170 is aware of the LEO satellite 110 location. The RD 170 can get the LEO satellite 110 location data from a number of different sources including, but not limited to, ephemeris tables, data directly downlinked from the LEO satellite 110, data received from a cell phone, and data from the internet. The RD 170 includes a first receiver for receiving the LEO satellite 110 signals 120, 140; an accurate clock for time stamping the data from the received signals 120, 140 with a received time; and memory for storing the time stamped data. In addition, the RD 170 includes a second receiver for receiving the differential correction information from the RRD 160. Also, the RD 170 has a processor for processing the time stamped data in its memory and the location of the LEO satellite 110 to generate a location estimate for itself. The processor is also used for processing the differential correction information with the location estimate of the RD 170 to generate a corrected location estimate for RD 170.

As an example, at an initial satellite position A, at time t1, the LEO satellite 110 sends a primary signal 120, 130 that is received by the RRD 160 at time t2a and by the RD 170 at time t3a. The processor of the RRD 160 calculates a differential correction signal, t2−t2a, where t2 represents the time the RRD 160 would have received the primary signal sent at time t1 if there were no delays due to atmospheric 180 and/or other conditions. This time, t2, is calculated from the known range between the LEO satellite 110 and the known location of the RRD 160. The RRD 160 then transmits 190 the differential correction information to the RD 170. The RD 170 corrects its received signal using the differential correction information. The RD 170 updates its location using the corrected timing, t3=t3a+t2a−t2, to get the corrected range from the RD 170 to the LEO satellite 110. The process is repeated for multiple satellite positions (including position B) to obtain an accurate position for the RD 170.

Figure 3:
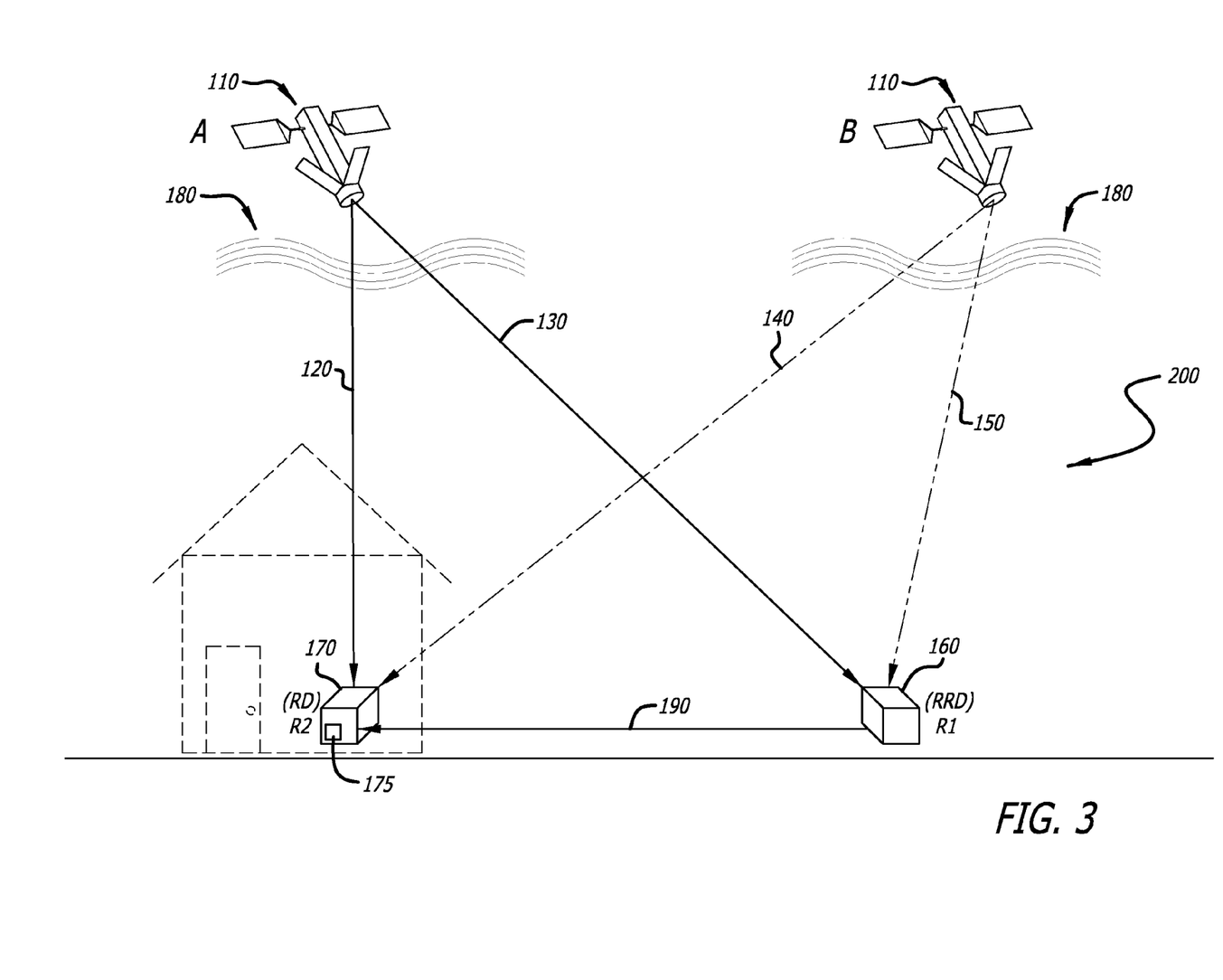
FIG. 3 shows an embodiment of the disclosed differential correction system enhancement that leverages roving receivers and employs a LEO satellite as a transmission source where the receiving device (RD) processes the differential correction information.

FIG. 3 shows an embodiment of the disclosed differential correction system enhancement 200 that leverages roving receivers and employs a LEO satellite as a transmission source where the receiving device (RD) processes the differential correction information. A LEO satellite 110 is shown in this figure to be transmitting signals 120, 130, 140, 150 to a roving reference device (RRD) 160 and to a receiving device (RD) 170 over time from position A to position B. The RRD 160 and RD 170 are in relatively close proximity to one another so that they have similar atmospheric conditions 180. In addition, the RRD 160 is aware of its location accurately via GPS signals. The RRD 160 includes a receiver for receiving the LEO satellite 110 signals 130, 150; an accurate clock for time stamping the data from the received signals 130, 150 with a received time; and a transmitter for transmitting 190 a RRD signal that contains the time stamped data and the location of the RRD.

The RD 170 is aware of LEO satellite 110 location. The RD 170 includes a first receiver for receiving the LEO satellite 110 signals 120, 140; and an accurate clock for time stamping the data from the received signals 120, 140 with a received time. Also, the RD 170 includes a second receiver for receiving the RRD signal from the RRD. In addition, the RD 170 has memory for storing its time stamped data, the data from the RRD signal, and the location of the LEO satellite 110. Also, the RD 170 has a processor 175 for processing the time stamped data of the RD and the location of the LEO satellite 110 to generate a location estimate for itself. In addition, the processor 175 is used for processing the time stamped data of the RRD 170 and the location of the RRD 170 to generate differential correction information. Additionally, the processor 175 is used for processing the differential correction information and the location estimate of the RD 160 to generate a corrected location estimate for the RD 160.

At an initial satellite position A, at time t1, the LEO satellite sends a primary signal 120, 130 that received by the RRD 160 at time t2a and by the RD 170 at time t3a. The RRD 160 sends its location and time t2a to the RD 170 for processing. From the RRD 160 location information and time t2a, the RD 170 calculates a differential correction signal, t2−t2a, where t2 represents the time the RRD 160 would have received the primary signal sent at time t1 if there were no delays due to atmospheric 180 and/or other conditions. This time, t2, is calculated from the known range between the satellite 110 and the known RRD 160 location. The RD 170 corrects its signal, t3a, using this differential correction. Using the corrected timing, t3=t3a+t2a−t2, to get the range from the RD 170 to the satellite 110, the RD 170 updates its location. This process is repeated for multiple satellite positions (including position B) to obtain an accurate position for the RD 170.

Figure 4:
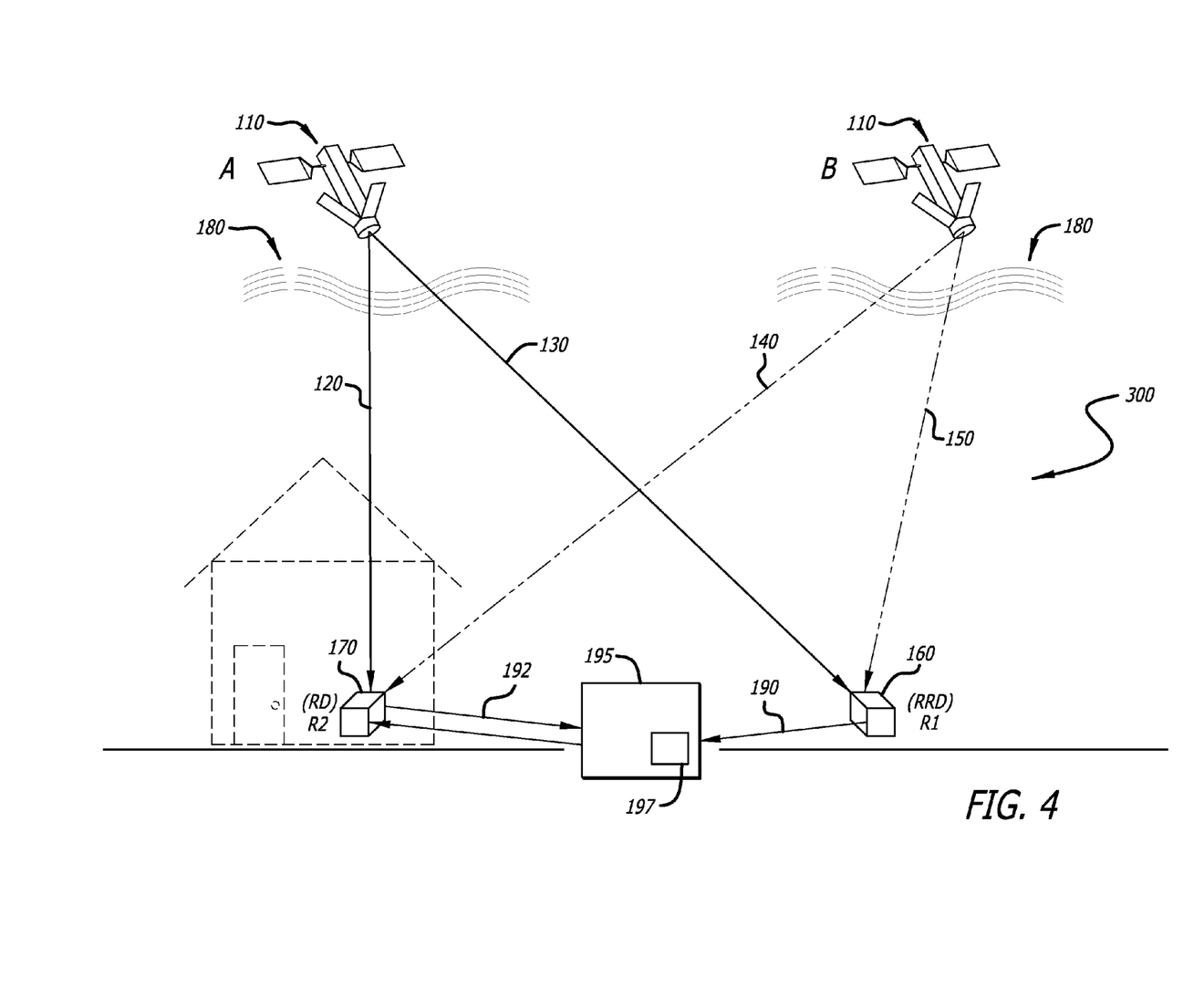
FIG. 4 illustrates an embodiment of the disclosed differential correction system enhancement that leverages roving receivers and employs a LEO satellite as a transmission source where the intermediary device processes the differential correction information.

FIG. 4 illustrates an embodiment of the disclosed differential correction system enhancement 300 that leverages roving receivers and employs a LEO satellite as a transmission source where the intermediary device processes the differential correction information. In this figure, a LEO satellite 110 is shown in this figure to be transmitting signals 120, 130, 140, 150 to a roving reference device (RRD) 160 and to a receiving device (RD) 170 over time from position A to position B. The RRD 160 and RD 170 are in relatively close proximity to one another so that they have similar atmospheric conditions 180. In addition, the RRD 160 is aware of its location accurately via GPS signals. The RRD 160 includes a receiver for receiving the LEO satellite 110 signals 130, 150; an accurate clock for time stamping the data from the received signals 130, 150 with a received time; and a transmitter for transmitting 190 a RRD signal that contains the time stamped data and the location of the RRD.

The RD 170 includes a receiver for receiving the LEO satellite 110 signals 120, 140; an accurate clock for time stamping the data from the received signals 120, 140 with a received time; and a transmitter for transmitting 192 a RD signal that contains the time stamped data of the RD.

The intermediary device 195 includes a first receiver for receiving the RRD signal from the RRD 160, and a second receiver for receiving the RD signal from the RD 170. In addition, the intermediary device 195 includes a processor 197 for processing the data of the RRD signal, the data of the RD signal, and the location of the LEO satellite 110 to generate a location estimate for the RD 170 and to generate differential correction information. Additionally, the processor 197 is used for processing the differential correction information and the location estimate for the RD 170 to generate a corrected location estimate for the RD 170.

In this example, at an initial satellite position A, at time t1, the LEO satellite 110 sends a primary signal 120, 130 that is received by the RRD 160 at time t2a and the RD 170 at time t3a. The RRD 160 sends its location and time t2a to the intermediary device 195. The RD 170 sends time t3a to the intermediary device 195. From the RRD 160 location information and time t2a, the intermediary device 195 calculates a differential correction signal, t2−t2a, where t2 represents the time the RRD 160 would have received the primary signal sent at time t1 if there were no delays due to atmospheric 180 and other conditions. This time, t2, is calculated from the known range between the LEO satellite 110 and the known RD 170 location. The intermediary device 195 corrects the RD signal, t3a, using this differential correction. Using corrected timing, t3=t3a+t2a−t2, to get the range from the RD 170 to the LEO satellite 110, the intermediary device 195 updates the RD 170 location. In at least one embodiment, this RD 170 location information is sent to the RD 170. This process is repeated for multiple satellite positions (including position B) to obtain an accurate location for the RD 170.

Figure 5:
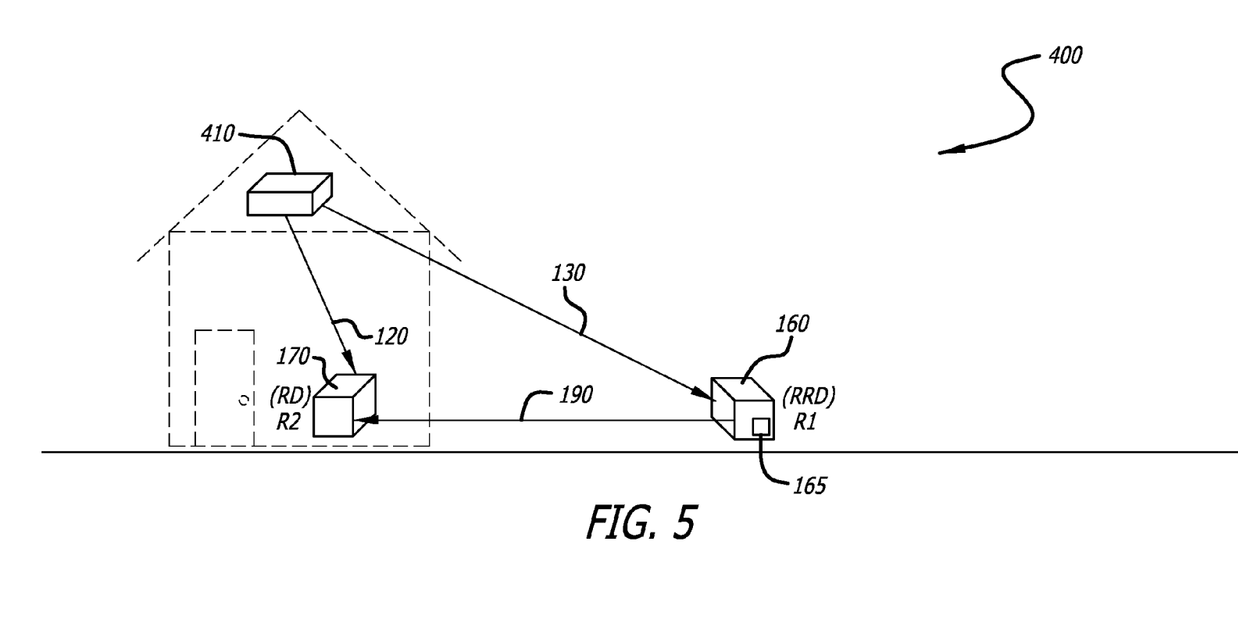
FIG. 5 shows an embodiment of the disclosed differential correction system enhancement that leverages roving receivers and employs a Wi-Fi node as a transmission source where the RRD processes the differential correction information.

FIG. 5 shows an embodiment of the disclosed differential correction system enhancement 400 that leverages roving receivers and employs a Wi-Fi node as a transmission source where the RRD processes the differential correction information. In this figure, a Wi-Fi node 410 is shown in this figure to be transmitting signals 120, 130 to a roving reference device (RRD) 160 and to a receiving device (RD) 170, respectively. The RRD 160 and RD 170 are in relatively close proximity to one another so that they have similar atmospheric conditions. However, it should be noted that atmospheric errors will likely be outweighed by the Wi-Fi node's 140 clock errors.

The RRD 160 is aware of the Wi-Fi node 410 location and its location accurately via GPS signals. The RRD 160 and the RD 170 are able to get Wi-Fi node 410 location information from various sources including, but not limited to, a database, data from a cell phone connection, data from the internet, and the Wi-Fi node 140 itself transmitting its own location information to the RRD 160 and/or the RD 170. The RRD 160 includes a receiver for receiving the Wi-Fi node 410 signal 130; an accurate clock for time stamping the data from the received signal 130 with a received time; and memory for storing the time stamped data. The RRD 160 also includes a processor 165 for processing the time stamped data, the RRD 160 location, and the Wi-Fi node 410 location to generate differential correction information; and a transmitter for transmitting 190 the differential correction information.

The RD 170 is aware of the Wi-Fi node 410 location. The RD 170 includes a first receiver for receiving the Wi-Fi node 410 signal 120; an accurate clock for time stamping the data from the received signal 120 with a received time; and memory for storing the time stamped data. In addition, the RD 170 includes a second receiver for receiving the differential correction information from the RRD 160. Also, the RD 170 has a processor for processing the time stamped data in its memory and the location of the Wi-Fi node 410 to generate a location estimate for itself. The processor is also used for processing the differential correction information with the location estimate of the RD 170 to generate a corrected location estimate for RD 170.

It should be noted that a second receiver for receiving the differential correction information in this case is not required. In lieu of the described example, the Wi-Fi communication channel itself could be used to transfer the differential correction information from the RRD 160 to the RD 170.

In this example, at a stationary Wi-Fi node 410 position, at time t1, a Wi-Fi node 410 sends a primary signal 120, 130 that is received by the RRD 160 at time t2a and the RD at time t3a. The RRD 160 calculates a differential correction signal, t2−t2a, where t2 represents the time the RRD 160 would have received the primary signal sent at time t1 if there were no delays due to atmospheric and/or other conditions. This time, t2, is calculated from the known range between the Wi-Fi node 410 location and the known RRD 160 location. The RRD 160, the RD 170, and the Wi-Fi node 140 all have accurate clocks. The Wi-Fi node 140 transmits a signal that can be used for timing (i.e. ranging). It should be noted that a high bandwidth signal is not required for ranging, and accuracy is a function of the signal time bandwidth product. The differential correction signal is sent 190 from the RRD 160 to the RD 170. The RD 170 corrects its signal, t3a, using this differential correction. The RD 170 updates its location using the corrected timing, t3=t3a+t2a−t2, to get the corrected range from the RD 170 to the Wi-Fi node 410.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A system for providing differential corrections for positioning, the system comprising:
 a roving reference device (RRD) that is aware of its geographic location via a first position-finding system, the RRD comprising:
  a RRD receiver for receiving a signal from at least one transmission source associated with a second position-finding system, wherein the RRD is aware of a location of the at least one transmission source,
  a RRD clock for collecting a first measurement of the signal,
  a RRD memory for storing the first measurement,
  a RRD processor for processing the first measurement, the location of the RRD, and the location of the at least one transmission source to generate differential correction information,
  a RRD transmitter for transmitting a differential correction information signal that includes the differential correction information; and
 a receiving device (RD) comprising:
  a RD first receiver for receiving the signal from the at least one transmission source, wherein the RD is aware of the location of the at least one transmission source,
  a RD clock for collecting a second measurement of the signal,
  a RD memory for storing the second measurement,
  a RD second receiver for receiving the differential correction information signal from the RRD,
  a RD processor for processing the differential correction information, the second measurement, and the location of the at least one transmission source to generate a location estimate for the RD.

2. The system of claim 1, wherein the RRD becomes aware of its location because the RRD further comprises a global positioning system (GPS) receiver for receiving GPS signals, and
 a GPS processor for processing the GPS signals to obtain the location of the RRD.

3. The system of claim 1, wherein the RRD becomes aware of its location because the RRD further comprises a cell receiver to receive signals from a cell tower, and
 a cell processor for processing the signals to obtain the location of the RRD.

4. The system of claim 1, wherein the RRD becomes aware of its location by using an inertial reference system.

5. The system of claim 1, wherein the RRD becomes aware of its location by using at least one of mapping and terrain data.

6. The system of claim 1, wherein the at least one transmission source is at least one of a satellite, pseudo-satellite, terrestrial transmitter, Wi-Fi transmitter, and cell tower transmitter.

7. The system of claim 6, wherein the at least one satellite is at least one of a low Earth orbiting (LEO) satellite, medium Earth orbit (MEO) satellite, and geosynchronous Earth orbit (GEO) satellite.

8. The system of claim 7, wherein the at least one LEO satellite is an Iridium satellite.

9. The system of claim 1, wherein the RRD is aware of the location of the at least one transmission source because the RRD receiver receives a location signal from the at least one transmission source indicating the location of the at least one transmission source, and
 wherein the RRD processor processes the location signal to obtain the location of the at least one transmission source.

10. The system of claim 1, wherein the RRD is at least one of mobile and stationary.

11. The system of claim 1, wherein the RRD transmitter transmits the differential correction information signal at least one of wirelessly or on a wired connection.

12. The system of claim 1, wherein the RD is aware of the location of the at least one transmission source because the RD first receiver receives a location signal from the at least one transmission source indicating the location of the at least one transmission source, and
 wherein the RD processor processes the location signal to obtain the location of the at least one transmission source.

13. The system of claim 1, wherein the RRD transmitter transmits the differential correction information signal to the RD second receiver via an intermediary device.

14. A system for providing differential corrections for positioning, the system comprising:
 a roving reference device (RRD) that is aware of its geographic location via a first position-finding system, the RRD comprising:
  a RRD receiver for receiving a signal from at least one transmission source associated with a second position-finding system,
  a RRD clock for collecting a first measurement of the signal,
  a RRD transmitter for transmitting a RRD signal that includes the first measurement and the location of the RRD; and
 a receiving device (RD) comprising:
  a RD first receiver for receiving the signal from the at least one transmission source, wherein the RD is aware of a location of the at least one transmission source,
  a RD clock for collecting a second measurement of the signal,
  a RD second receiver for receiving the RRD signal from the RRD,
  a RD memory for storing the first measurement, the second measurement, and the location of the RRD,
  a RD processor for processing the second measurement and the location of the at least one transmission source to generate a location estimate for the RD, for processing the first measurement, the location of the RRD, and the location of the at least one transmission source to generate differential correction information, and for processing the differential correction information and the location estimate for the RD to generate a corrected location estimate for the RD.

15. The system of claim 14, wherein the RRD becomes aware of its location because the RRD further comprises a global positioning system (GPS) receiver for receiving GPS signals, and a GPS processor for processing the GPS signals to obtain the location of the RRD.

16. The system of claim 14, wherein the RRD becomes aware of its location because the RRD further comprises a cell receiver to receive signals from a cell tower, and a cell processor for processing the signals to obtain the location of the RRD.

17. The system of claim 14, wherein the RRD becomes aware of its location by using an inertial reference system.

18. The system of claim 14, wherein the RRD becomes aware of its location by using at least one of mapping and terrain data.

19. The system of claim 14, wherein the RRD is at least one of mobile and stationary.

20. The system of claim 14, wherein the RRD transmitter transmits the RRD signal at least one of wirelessly or on a wired connection.

21. The system of claim 14, wherein the at least one transmission source is at least one of a satellite, pseudo-satellite, terrestrial transmitter, Wi-Fi transmitter, and cell tower transmitter.

22. The system of claim 21, wherein the at least one satellite is at least one of a low Earth orbiting (LEO) satellite, medium Earth orbit (MEO) satellite, and geosynchronous Earth orbit (GEO) satellite.

23. The system of claim 22, wherein the at least one LEO satellite is an Iridium satellite.

24. The system of claim 14, wherein the RD is aware of the location of the at least one transmission source because the RD first receiver receives a location signal from the at least one transmission source indicating the location of the at least one transmission source, and wherein the RD processor processes the location signal to obtain the location of the at least one transmission source.

25. The system of claim 14, wherein the RRD transmitter transmits the RRD signal to the RD second receiver via an intermediary device.

26. A system for providing differential corrections for positioning, the system comprising:

a roving reference device (RRD) that is aware of its geographic location via a first position-finding system, the RRD comprising:

a RRD receiver for receiving a signal from at least one transmission source associated with a second position-finding system, a RRD clock for collecting a first measurement of the signal, a RRD transmitter for transmitting a RRD signal that includes the first measurement and the location of the RRD;

a receiving device (RD) comprising:

a RD receiver for receiving the signal from the at least one transmission source, a RD clock for collecting a second measurement of the signal, a RD transmitter for transmitting a RD signal that includes the second measurement; and an intermediary device that is aware of a location of the at least one transmission source, the intermediary device comprising:

an intermediary first receiver for receiving the RRD signal from the RRD, an intermediary second receiver for receiving the RD signal from the RD, an intermediary processor for processing data of the RRD signal and data of the RD signal and the location of the at least one transmission source to generate a location estimate for the RD and to generate differential correction information, and for processing the differential correction information and the location estimate for the RD to generate a corrected location estimate for the RD.

27. The system of claim 26, wherein the RRD becomes aware of its location because the RRD further comprises a global positioning system (GPS) receiver for receiving GPS signals, and a GPS processor for processing the GPS signals to obtain the location of the RRD.

28. The system of claim 26, wherein the RRD becomes aware of its location because the RRD further comprises a cell receiver to receive signals from a cell tower, and a cell processor for processing the signals to obtain the location of the RRD.

29. The system of claim 26, wherein the RRD becomes aware of its location by using an inertial reference system.

30. The system of claim 26, wherein the RRD becomes aware of its location by using at least one of mapping and terrain data.

31. The system of claim 26, wherein the RRD is at least one of mobile and stationary.

32. The system of claim 26, wherein the RRD transmitter transmits the RRD signal at least one of wirelessly or on a wired connection.

33. The system of claim 26, wherein the at least one transmission source is at least one of a satellite, pseudo-satellite, terrestrial transmitter, Wi-Fi transmitter, and cell tower transmitter.

34. The system of claim 33, wherein the at least one satellite is at least one of a low Earth orbiting (LEO) satellite, medium Earth orbit (MEO) satellite, and geosynchronous Earth orbit (GEO) satellite.

35. The system of claim 34, wherein the at least one LEO satellite is an Iridium satellite.

36. The system of claim 26, wherein the RD transmitter transmits the RD signal at least one of wirelessly or on a wired connection.

* * * * *